United States Patent
Kim et al.

(10) Patent No.: US 11,508,077 B2
(45) Date of Patent: Nov. 22, 2022

(54) METHOD AND APPARATUS WITH MOVING OBJECT DETECTION

(71) Applicants: SAMSUNG ELECTRONICS CO., LTD., Suwon-si (KR); SNU R&DB FOUNDATION, Seoul (KR)

(72) Inventors: Hyoun Jin Kim, Seoul (KR); Haram Kim, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 24 days.

(21) Appl. No.: 17/167,433

(22) Filed: Feb. 4, 2021

(65) Prior Publication Data
US 2021/0358146 A1    Nov. 18, 2021

Related U.S. Application Data

(60) Provisional application No. 63/026,228, filed on May 18, 2020.

(30) Foreign Application Priority Data

Sep. 4, 2020    (KR) .......................... 10-2020-0113016

(51) Int. Cl.
*G06T 7/507*    (2017.01)
*G06T 7/579*    (2017.01)
(Continued)

(52) U.S. Cl.
CPC ............. *G06T 7/507* (2017.01); *G06T 3/0093* (2013.01); *G06T 7/579* (2017.01); *G06T 7/70* (2017.01)

(58) Field of Classification Search
CPC ....... G06T 7/507; G06T 3/0093; G06T 7/579; G06T 7/70; G06T 7/254; G06T 2207/10024; G06T 2207/10028
See application file for complete search history.

(56) References Cited

U.S. PATENT DOCUMENTS

| 9,383,445 B2 | 7/2016 | Lu et al. |
| 9,702,977 B2 | 7/2017 | Holz |

(Continued)

FOREIGN PATENT DOCUMENTS

| CN | 111210429 B | * 8/2020 |
| JP | 2006-134035 A | 5/2006 |

(Continued)

OTHER PUBLICATIONS

Kim, Haram, Pyojin Kim, and H. Jin Kim. "Moving object detection for visual odometry in a dynamic environment based on occlusion accumulation." 2020 IEEE International Conference on Robotics and Automation (ICRA). IEEE, 2020 (1 page in English). https://youtu.be/VVKhPwpGHVw.

*Primary Examiner* — Chan S Park
*Assistant Examiner* — Daniel C Chang
(74) *Attorney, Agent, or Firm* — NSIP Law

(57) ABSTRACT

A processor-implemented method of detecting a moving object includes: estimating a depth image of a current frame; determining an occlusion image of the current frame by calculating a depth difference value between the estimated depth image of the current frame and an estimated depth image of a previous frame; determining an occlusion accumulation image of the current frame by adding a depth difference value of the occlusion image of the current frame to a depth difference accumulation value of an occlusion accumulation image of the previous frame; and outputting an area of a moving object based on the occlusion accumulation image.

16 Claims, 10 Drawing Sheets

(51) Int. Cl.
  *G06T 3/00*  (2006.01)
  *G06T 7/70*  (2017.01)

(56) References Cited

U.S. PATENT DOCUMENTS

| | | | | |
|---|---|---|---|---|
| 2007/0146232 | A1* | 6/2007 | Redert | G06T 7/50 |
| | | | | 382/285 |
| 2015/0055828 | A1* | 2/2015 | Zhao | G06T 7/248 |
| | | | | 382/103 |
| 2017/0148168 | A1* | 5/2017 | Lindner | G06T 5/001 |
| 2018/0359449 | A1* | 12/2018 | Matsumoto | G08B 13/19686 |
| 2019/0206066 | A1 | 7/2019 | Saleemi et al. | |
| 2019/0279379 | A1 | 9/2019 | Srinivasan et al. | |
| 2019/0385291 | A1* | 12/2019 | Tanaka | H04N 9/646 |
| 2021/0241495 | A1* | 8/2021 | Cappello | G06T 7/90 |

FOREIGN PATENT DOCUMENTS

| | | |
|---|---|---|
| JP | 2015-41381 A | 3/2015 |
| KR | 10-2014-0109790 A | 9/2014 |
| KR | 10-1558258 B1 | 10/2015 |
| KR | 10-2017-0064101 A | 6/2017 |
| KR | 10-2017-0064652 A | 6/2017 |
| KR | 10-1755023 B1 | 7/2017 |
| KR | 10-2019-0013186 A | 2/2019 |

* cited by examiner

METHOD AND APPARATUS WITH MOVING OBJECT DETECTION

CROSS-REFERENCE TO RELATED APPLICATIONS

This application claims the benefit under 35 USC § 119(e) of US Provisional Application No. 63/026,228 filed on May 18, 2020, and the benefit under 35 USC § 119(a) of Korean Patent Application No. 10-2020-0113016 filed on Sep. 4, 2020, in the Korean Intellectual Property Office, the entire disclosures of which are incorporated herein by reference for all purposes.

BACKGROUND

1. Field

The following description relates to a method and apparatus with moving object detection.

2. Description of Related Art

A moving object may refer to an object that moves relative to a background. The moving object may be referred to as a foreground. An area that is occluded as the moving object moves may be referred to as an occlusion area. A portion that is newly discovered as the moving object moves may be referred to as a reappearance area. In general, the background may have a greater depth value than the foreground. Therefore, a pixel with a decreasing depth value may be regarded as a pixel of the moving object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of detecting a moving object includes: estimating a depth image of a current frame; determining an occlusion image of the current frame by calculating a depth difference value between the estimated depth image of the current frame and an estimated depth image of a previous frame; determining an occlusion accumulation image of the current frame by adding a depth difference value of the occlusion image of the current frame to a depth difference accumulation value of an occlusion accumulation image of the previous frame; and outputting an area of a moving object based on the occlusion accumulation image.

The estimating may include: warping coordinates of the depth image of the previous frame into coordinates of the depth image of the current frame based on position information or pose information of a camera; and estimating an area having an inestimable depth value in the depth image of the current frame using the warped depth image of the previous frame.

The outputting of the area may include outputting the area of the moving object in a color image, and the area having the inestimable depth value may be an area having a depth value that is not estimated by a depth sensor used to generate the depth images due to a position or angle difference between the depth sensor and another sensor used to estimate the color image.

The determining of the occlusion accumulation image of the current frame may include estimating a depth difference accumulation value of a newly discovered area in the occlusion accumulation image of the current frame based on a similarity between a depth value of the depth image of the current frame and the occlusion accumulation image of the previous frame.

The newly discovered area may correspond to an area outside of a boundary of the depth image of the current frame.

The determining of the occlusion accumulation image of the current frame may include initializing a pixel with a depth difference accumulation value being less than or equal to a first threshold value in the occlusion accumulation image.

The initializing of the pixel may include initializing the depth difference accumulation value of the pixel to a value of "0".

The determining of the occlusion accumulation image of the current frame may include initializing a pixel with a depth difference value being less than or equal to a second threshold value in the occlusion accumulation image.

The outputting may include: determining an area including one or more pixels having a depth difference accumulation value being greater than a first threshold value in the occlusion accumulation image; and outputting a masking image representing an area of the moving object based on the determined area.

A non-transitory computer-readable storage medium may store instructions that, when executed by one or more processors, configure the one or more processors to perform the method.

In another general aspect, an apparatus for detecting a moving object includes: one or more processors configured to: estimate a depth image of a current frame, determine an occlusion image of the current frame by calculating a depth difference value between the estimated depth image of the current frame and an estimated depth image of a previous frame, determine an occlusion accumulation image of the current frame by adding a depth difference value of the occlusion image of the current frame to a depth difference accumulation value of an occlusion accumulation image of the previous frame, and output an area of a moving object based on the occlusion accumulation image.

For the estimating, the one or more processors may be configured to: warp coordinates of the depth image of the previous frame into coordinates of the depth image of the current frame based on position information or pose information of a camera, and estimate an area having an inestimable depth value in the depth image of the current frame using the warped depth image of the previous frame.

For the determining of the occlusion accumulation image of the current frame, the one or more processors may be configured to: estimate a depth difference accumulation value of a newly discovered area in the occlusion accumulation image of the current frame based on a similarity between a depth value of the depth image of the current frame and the occlusion accumulation image of the previous frame.

For the determining of the occlusion accumulation image of the current frame, the one or more processors may be configured to: initialize a pixel with a depth difference accumulation value being less than or equal to a first threshold value in the occlusion accumulation image.

For the determining of the occlusion accumulation image of the current frame, the one or more processors may be configured to: initialize a pixel with a depth difference value being less than or equal to a second threshold value in the occlusion accumulation image.

For the outputting, the one or more processors may be configured to: obtain an area including one or more pixels having a depth difference accumulation value being greater than a first threshold value in the occlusion accumulation image, and output a masking image representing an area of the moving object based on the obtained area.

The apparatus may include a memory storing instructions that, when executed by the one or more processors, configure the one or more processors to perform the estimating of the depth image of the current frame, the determining of the occlusion image of the current frame, the determining of the occlusion accumulation image of the current frame, and the outputting of the area of the moving object.

In another general aspect, a processor-implemented method of detecting a moving object includes: acquiring a current depth image including an area in which a depth value is not obtained by a depth sensor; estimating the current depth image, including the area not obtained by the depth sensor, by warping a previous depth image into coordinates of the current depth image; and determining a current occlusion image by calculating a difference between the estimated depth image and the previous depth image; determining a current occlusion accumulation image by adding the current occlusion image to a previous occlusion accumulation image; and outputting an area of a moving object based on the current occlusion accumulation image.

Other features and aspects will be apparent from the following detailed description, the drawings, and the claims.

Figure 1:
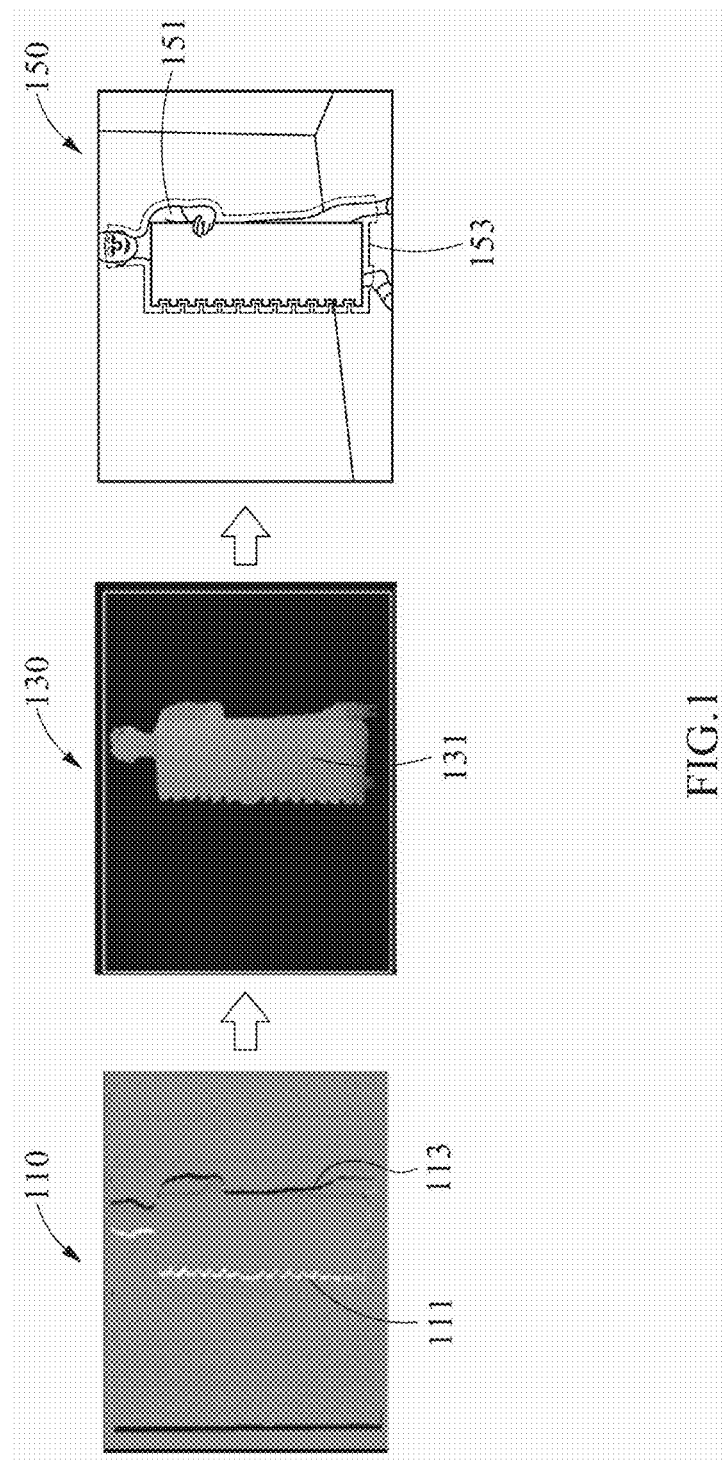
FIG. 1 illustrates an example of detecting a moving object in an input image by a moving object detecting apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of detecting a moving object in an input image by a moving object detecting apparatus.

A moving object detecting apparatus may detect a moving object in an image based on depth information. The moving object detecting apparatus may detect the moving object in the image in a dynamic environment based on the depth information and on position information and/or pose information of a camera. The moving object detecting apparatus may detect the moving object in the image based on a result of accumulating depth value differences. The moving object detecting apparatus may pixelwisely detect the moving object.

The moving object detecting apparatus may recognize an area of the moving object by accumulating depth value differences between a depth image of a current frame and a depth image of a previous frame. The moving object detecting apparatus may derive depth value differences between the depth image of the current frame and a depth image of the initial frame captured by a depth sensor through the process of accumulating the depth value differences.

The moving object detecting apparatus may more accurately distinguish between the moving object and a background in the dynamic environment where the camera moves. The moving object detecting apparatus of one or more embodiments may detect the moving object without separate training even when a new environment or object appears in the image. The moving object detecting apparatus of one or more embodiments may accurately detect the moving object even when the moving object occupies many areas of the image. When the object occupies a relatively large portion of the image compared to the background, the moving object detecting apparatus of one or more embodiments may accurately detect the moving object by stably accumulating depth changes based on the position information and/or the pose information.

The moving object detecting apparatus of one or more embodiments may not store the entire background information, and thus the memory usage may not increase greatly even after time. The moving object detecting apparatus of one or more embodiments may use the image in which depth value changes are accumulated and thus, may not need to build a separate background map and may have a relatively small operation quantity and memory usage compared to a typical moving object detecting apparatus. The moving object detecting apparatus of one or more embodiments may pixelwisely detect the area of the moving object and thus, may accurately detect the area, compared to detecting the area using a bounding box as done by a typical moving object detecting apparatus. Further, even when there is no previous depth information of a newly discovered area as the depth sensor moves, the moving object detecting apparatus of one or more embodiments may distinguish the moving object from the background.

Hereinafter, a dynamic environment may refer to an environment where the camera moves. A static environment refers to an environment where the camera is fixed. A depth sensor may be a sensor configured to obtain depth information by capturing an object. The depth sensor may include, for example, a stereo depth sensor, a time of flight (ToF) depth sensor, and/or a structured pattern depth sensor, but are not limited thereto, and may include any or all types of sensors that may obtain depth information. A color sensor may be a sensor configured to obtain color information of one or more color channels by capturing an object.

A depth difference value may refer to a difference in depth values, and a depth difference accumulation value may refer to a result of accumulating depth difference values. An occlusion image may refer to a map configured with depth difference values. The occlusion image may include both an occlusion area corresponding to a portion that is newly occluded as a moving object moves and a reappearance area corresponding to a portion that newly appears as the moving object moves. An occlusion accumulation image may refer to a map configured with depth difference accumulation values. Position information of a camera may refer to three-dimensional (3D) coordinates of a position of the camera, and pose information of the camera may refer to a direction that the camera faces at a fixed position. The position information and the pose information of the camera may represent a 6-degree of freedom (DoF) physical quantity.

The moving object detecting apparatus may use visual odometry to estimate the 6-DoF position information and pose information of the camera based on image information of the camera, but is not limited thereto. The position information and pose information of the camera may be obtained in various manners. Visual odometry may be referred to as image navigation. Image navigation may include a feature-based method and a density-based method, but is not limited thereto, and may include all kinds of algorithms for estimating the position of an object through an image.

To this end, the moving object detecting apparatus may perform occlusion accumulation, depth compensation, and occlusion prediction on a newly discovered area. In the occlusion accumulation, the moving object detecting apparatus may recognize a moving object by accumulating depth value differences of a depth sensor. The moving object detecting apparatus may obtain differences between consecutive depth values of corresponding pixels, and acquire an occlusion accumulation image by accumulating the differences.

The moving object detecting apparatus may warp a depth image of a previous frame into a depth image of a current frame based on the position information and pose information of the camera. Through this, the moving object detecting apparatus may acquire a depth image considering a movement of the camera. Here, image warping may be a type of geometric transformation, and may refer to an operation of transforming a pixel at (x, y) coordinates in a previous frame to a pixel at (x', y') coordinates in a current frame.

The moving object detecting apparatus may acquire an occlusion image by calculating a depth value difference of a depth image in which the movement of the camera is compensated. When there appears no change in a depth image in which a pose is corrected in an environment without a moving object, the occlusion image may not have any value. When there is a moving object, the background may be occluded by the moving object, and thus the depth may change, such that the shape of the moving object may appear in the occlusion image. When occlusion images are continuously accumulated, the accumulation value may change along a trajectory of the moving object. When the acquired occlusion accumulation image is initialized based on a threshold value, the moving object may be clearly and accurately distinguished. Initializing the occlusion accumulation image based on the threshold value may be referred to as truncation in the sense of initializing a value less than the threshold value to a predetermined value.

$$\Delta Z_i(u, \xi_i^{i+1}) = Z_i(w(u, \xi_i^{i+1})) - Z_{i+1}(u) \quad \text{Equation 1:}$$

Equation 1 above is a formula for calculating a depth difference value to acquire an occlusion image, for example. Z denotes a depth value. $\Delta Z_i$ greater than 0 indicates the depth value decreases, which may indicate the background is occluded by a moving object and thus, represents an occlusion area. $\Delta Z_i$ less than or equal to 0 indicates the depth value increases, which may indicate that the background reappears from the moving object and thus, represents a reappearance area.

$\xi_i^{i+1}$ denotes a parameter of the camera between an $i^{th}$ frame and an $(i+1)^{th}$ frame. For example, the parameter of the camera may include position information and pose information and may be 6-DoF information. W denotes a warping function. $W(u, \xi_i^{i+1})$ denotes a pixel of the $i^{th}$ frame corresponding to a pixel u of the $(i+1)^{th}$ frame based on the parameter of the camera. Consequently, Equation 1 expresses a depth value difference between the $(i+1)^{th}$ frame and the $i^{th}$ frame with respect to the pixel u.

$$W(u, \xi_i^{i+1}) = \pi(\exp(\xi_i^{i+1})\pi^{-1}(u, Z_i(u))) \quad \text{Equation 2:}$$

Equation 2 above is a formula that describes the warping function in more detail, for example. π denotes a project function that maps a 3D point to a pixel of a 2D image. $\exp(\xi_i^{i+1})$ denotes a transformation matrix for the camera parameter $\xi_i^{i+1}$.

$$A_{i+1}(u) = \Delta Z_i(u, \xi_i^{i+1}) + \tilde{A}_i(W(u, \xi_i^{i+1})) \quad \text{Equation 3:}$$

Equation 3 above is a formula for obtaining a depth difference accumulation value to acquire an occlusion accumulation image, for example. $A_{i+1}(u)$ denotes a depth difference accumulation value for the pixel u of the $(i+1)^{th}$ frame. $\tilde{A}$ denotes a depth difference accumulation value that is processed based on the threshold value, that is, processed through truncation. According to Equation 3, the depth difference accumulation value of the $(i+1)^{th}$ frame is a result of adding the depth difference value between the $i^{th}$ frame and the $(i+1)^{th}$ frame to the depth difference accumulation value of the $i^{th}$ frame.

Equation 4:

$$\approx \Delta Z_i(u, \xi_i^{i+1}) + \sum_{k=1}^{i} \Delta Z_k(w(u, \xi_{k+1}^i), \xi_k^{k+1})$$

$$\approx Z_{k_u}(w(u, \xi_{k_u}^{i+1})) - Z_{i+1}(u)$$

When the truncation is not triggered, $A(u) = \tilde{A}(u)$ is satisfied, and thus Equation 3 may be approximated to Equation 4 above, for example. Here, $k_u$ denotes an index of a frame where the pixel u of the current frame is first observed. In the end, when the truncation is not triggered, the occlusion accumulation image of the $(i+1)^{th}$ frame may be approximated to a difference between the depth value of the pixel u of the $(i+1)^{th}$ frame and a depth value of a pixel corresponding to the pixel u in the frame in which the pixel u first appears.

The result of approximation in Equation 4 indicates the difference between the depth value of the current frame and the depth value of the frame in which the corresponding area first appears, which, however, is established because the truncation is not triggered. When the depth value of a current frame is simply subtracted from the depth value of a first frame, a reappearance area may not be processed due to the movement of the camera and the movement of the moving object, such that the background and the moving object may not be clearly and/or accurately distinguished.

$$\tilde{A}_i(u) = 0 \text{ for } A_i(u) \leq \tau_\alpha(u) \quad \text{Equation 5:}$$

$$\tilde{A}_i(u) = 0 \text{ for } \Delta Z_i(u, \xi_i^{i+1}) \leq -\tau_\beta(u) \quad \text{Equation 6:}$$

Equations 5 and 6 above are formulas for processing the reappearance area through the truncation of the occlusion accumulation image, for example. According to Equation 5, when the depth difference accumulation value $A_i(u)$ in the occlusion accumulation image is less than a first threshold value $\tau_\alpha(u)$, the depth difference accumulation value may be initialized to "0". Equation 5 indicates initializing the reappearing background area by initializing the depth difference accumulation value to "0" when the depth difference accumulation value is close to "0" or negative.

According to Equation 6, when the depth difference value $\Delta Z_i(u, \xi_i^{i+1})$ in the occlusion accumulation image is less than a second threshold value, the depth difference accumulation value may be initialized to "0". In the occlusion accumulation image, there may occur an error of the depth value increasing as the distance between the depth sensor and the captured object increases and an error in the pose value of the camera. When the background reappears, and the depth difference value is not exactly "0" but is greater than "0", the background may be misrecognized as the moving object.

For example, as the moving object passes, the depth value may change from 5 m to 1 m and then to 3 m. Here, the depth value of 3 m is a case where the depth value is failed to return to 5 m due to an error. Due to the depth difference value 2 m between 3 m and 1 m, the corresponding area may be recognized as an area of the moving object. In this case, Equation 6 indicates initializing the corresponding area to the background. The moving object detecting apparatus may initialize the area to the background if the depth difference value is less than the second threshold value according to Equation 6.

Referring to FIG. 1, an occlusion image 110 represents a moving object using a white boundary and a black boundary. The moving object is moving leftward, and thus a left boundary 111 of the moving object is marked in white. A right boundary 113 of the moving object is marked in black. In an example, the left boundary 111 may correspond to an occlusion area and the right boundary 113 may correspond to a reappearance area. An occlusion accumulation image 130 may be acquired by accumulating the occlusion image 110. As a reappearance area is initialized, the occlusion accumulation image 130 shows a result 131 of accumulating an occlusion area. The result 131 of accumulating the occlusion area may correspond to the area of the moving object of a current frame.

The moving object detecting apparatus may output a masking image 153 that distinguishes the area of the moving object from the background. The masking image 153 may be an image representing the boundary of the moving object by moving object segmentation. A portion representing the moving object may be referred to as a masking area. For example, the masking area may be filled with a single color. The background area and the masking area may be distinguished by "0" and "1". In a color image 150, the masking image 153 shows a result of accurately matching to a moving object 151.

In the depth compensation, the moving object detecting apparatus may compensate for the depth value based on position information or pose information of the depth sensor. When the depth value is not compensated, an error may occur during the occlusion accumulation. The moving object detecting apparatus of one or more embodiments may compensate for unmeasured depth values around the moving object by warping the depth value of a previous frame before accumulating the depth value differences.

A general depth sensor may not estimate or measure a depth value near the boundary of an object due to an error of the general depth sensor. In such an area where the depth value cannot be estimated, an unnecessary stripe pattern may be generated, and a clean (or clear or accurate) occlusion accumulation image may not be derived. To solve this problem, the moving object detecting apparatus of one or more embodiments may compensate for a portion with an unestimated or unmeasured depth value.

In the occlusion accumulation prediction, the moving object detecting apparatus may predict a depth difference accumulation value of an area newly discovered by the depth sensor based on a similarity between the depth value and the occlusion accumulation image. When an area that has not been captured before is newly captured, there may be no depth value to be compared. In this case, the depth difference accumulation value of the area that has not been compared may not be calculated and thus, may be set to, for example, a default value. The moving object detecting apparatus may average pixel values of adjacent occlusion accumulation images and estimate the depth difference accumulation value based on the result.

Since this estimation process may be performed when there is a depth difference accumulation value for a nearby pixel, the moving object detecting apparatus may repeatedly perform the estimation process until all pixels for the newly discovered area are processed. Through the estimation process, a pixel, the depth value of which is highly likely to change, may have a value estimated by the estimation process. When the moving object is distinguished by truncating the accumulation image based on a predetermined criterion, the moving object may be accurately distinguished even for an area that has not been captured before and has no depth value to be compared.

Figure 2:
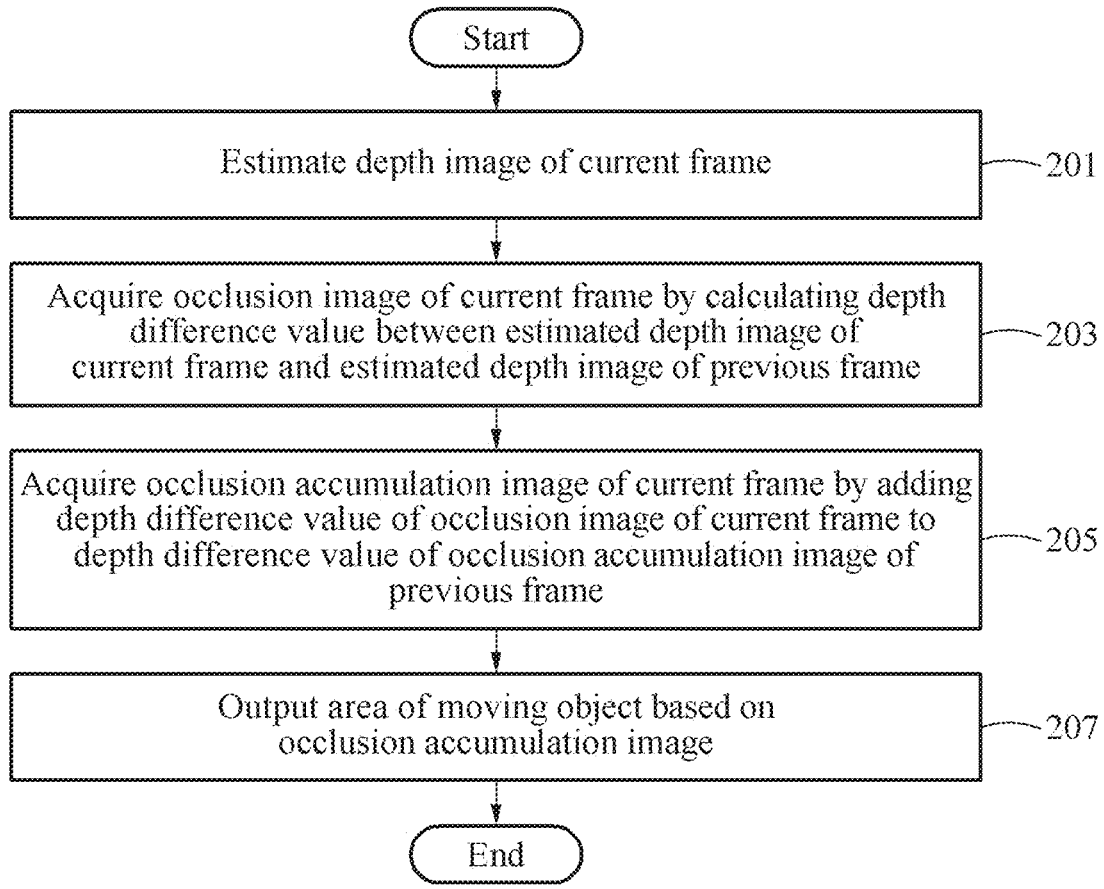
FIG. 2 illustrates an example of a moving object detecting method.

FIG. 2 illustrates an example of a moving object detecting method.

In operation 201, a moving object detecting apparatus may estimate a depth image of a current frame. An index of the current frame may be i+1 of Equation 1. The moving object detecting apparatus may preprocess the depth image. The moving object detecting apparatus may warp coordinates of a depth image of a previous frame into coordinates of the depth image of the current frame based on position information or pose information of a camera. The moving object detecting apparatus may estimate an area having an inestimable depth value that is not estimated (or cannot be accurately estimated) by the depth sensor in the depth image of the current frame using the warped depth image of the previous frame.

In operation 203, the moving object detecting apparatus may acquire an occlusion image of the current frame by calculating a depth difference value between the estimated depth image of the current frame and an estimated depth image of the previous frame. For example, a pixel of the occlusion image of the current frame may be acquired by calculating a depth difference value between a corresponding pixel of the estimated depth image of the current frame and a corresponding pixel of the estimated depth image of the previous frame. An index of the previous frame is i of Equation 1. The depth difference value may be $\Delta Z_i$ of Equation 1 above, for example.

In operation 205, the moving object detecting apparatus may acquire an occlusion accumulation image of the current frame by adding a depth difference value of the occlusion image of the current frame to a depth difference accumulation value of an occlusion accumulation image of the previous frame. For example, a depth difference accumulation value of a pixel of the occlusion accumulation image of the current frame may be acquired by adding a depth difference value of a corresponding pixel of the occlusion image of the current frame to a depth difference accumulation value of a corresponding pixel of an occlusion accumulation image of the previous frame.

The moving object detecting apparatus may acquire the occlusion accumulation image that is more accurately mapped to the moving object by performing truncation on a reappearance area. For example, the moving object detecting apparatus may initialize a pixel with a depth difference accumulation value being less than or equal to a first threshold value in the occlusion accumulation image. For example, when the depth difference accumulation value of the pixel is close to "0" or negative, the moving object detecting apparatus may initialize a reappearing background area by initializing the depth difference accumulation value to "0".

To remove errors occurring in the occlusion accumulation image due to an error of the depth value increasing as the distance between the depth sensor and the captured object increases and an error in the pose value of the camera, the moving object detecting apparatus may initialize the reappearance area. The moving object detecting apparatus may initialize a pixel with a depth difference value being less than or equal to a second threshold value in the occlusion accumulation image. When the depth difference value is less than the second threshold value, the moving object detecting apparatus may initialize the corresponding area to the background.

In operation 207, the moving object detecting apparatus may output an area of the moving object based on the occlusion accumulation image. The moving object detecting apparatus may obtain an area including one or more pixels having a depth difference accumulation value being greater than a first threshold value in the occlusion accumulation image. The moving object detecting apparatus may output a masking image representing the area of the moving object based on the obtained area. The masking area may be filled with a single color. The background area and the masking area may be distinguished by "0" and "1", respectively.

Figure 3A:
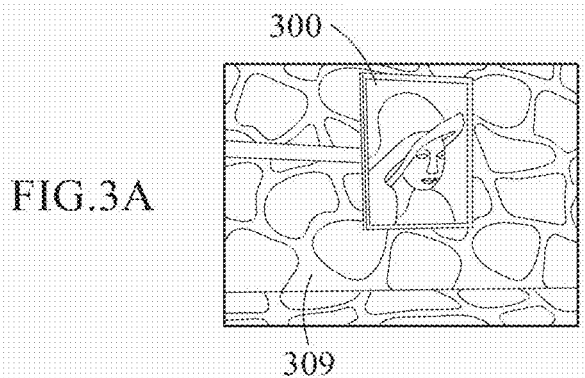
FIG. 3A illustrates an example of a color image that is input.
Figure 3B:
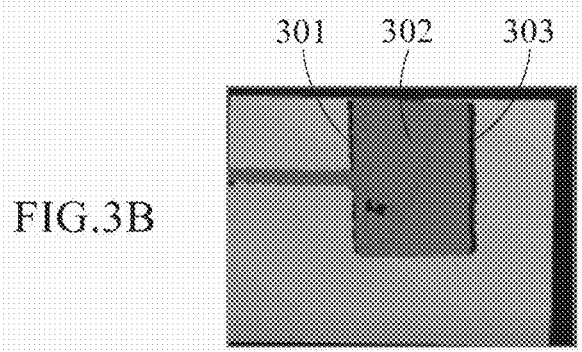
FIG. 3B illustrates an example of a depth image acquired without performing depth value compensation.
Figure 3C:
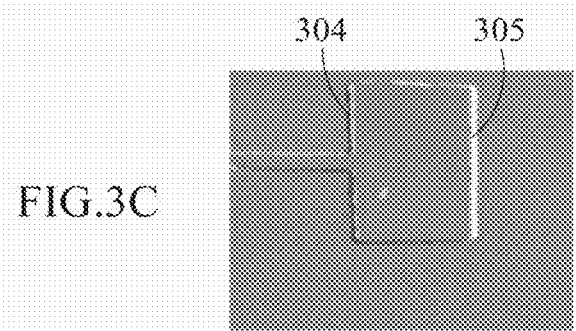
FIG. 3C illustrates an example of an occlusion image acquired without performing depth value compensation.
Figure 3D:
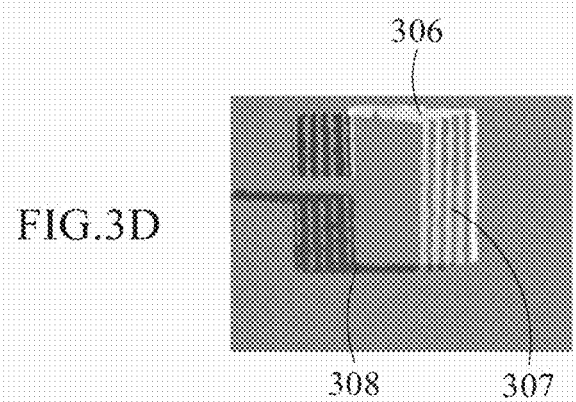
FIG. 3D illustrates an example of an occlusion accumulation image acquired without performing depth value compensation.

Hereinafter, FIGS. 3A to 3D are provided to describe noise appearing in an occlusion accumulation image acquired without performing depth value compensation. FIG. 3A illustrates an example of a color image that is input. FIG. 3B illustrates an example of a depth image acquired without performing depth value compensation. FIG. 3C illustrates an example of an occlusion image acquired without performing depth value compensation. FIG. 3D illustrates an example of an occlusion accumulation image acquired without performing depth value compensation.

FIG. 3A shows a color image that is input, where the color image includes a moving object 300 and a background 309. FIG. 3B shows a depth image acquired without performing depth value compensation, where a moving object 302 is displayed in the depth image. Due to physical limitations such as a position or angle difference between a depth sensor and a color sensor, there may be an area having an inestimable depth value in the vicinity of a boundary of an object. An area having an inestimable depth value may be an area in which a depth value is not estimated, or is not accurately estimated, by the depth sensor due to the physical limitations such as the position or the angle difference between the depth sensor and the color sensor. Black areas 301 and 303 shown on the left and right sides of the moving object 302 are inestimable areas. The slanted black areas on the edges of the depth image are portions generated when the depth image is warped into the coordinates of the color image.

When the depth image of FIG. 3B is a depth image of a current frame, the occlusion image of FIG. 3C may be acquired by obtaining the depth image of FIG. 3B and a depth value difference between a depth image of a previous frame and the depth image of FIG. 3B. The moving object is moving rightward. An occlusion area 305 appears on the right side of the moving object, and a reappearance area 304 appears on the left side of the moving object.

FIG. 3D shows the occlusion accumulation image acquired by accumulating the occlusion image of FIG. 3C. When a general depth sensor is used, an area having an inestimable depth value may be generated in the vicinity of the boundary of the object due to measurement errors. An undesired stripe pattern 307 may be generated by the area having an inestimable depth value, such that a clear and/or accurate occlusion accumulation image cannot be acquired. A white area 306 corresponds to a depth value difference between the current frame and a frame ($k_u$ of Equation 4, for example) in which the area first appears, for an area where the moving object of the current frame is present. A dark gray area 308 corresponds to a depth value difference between the current frame and the frame ($k_u$ of Equation 4, for example) in which the area first appears, for an area where the moving object of the first frame is present.

Figure 3E:
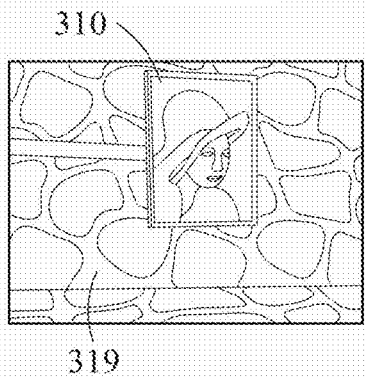
FIG. 3E illustrates an example of a color image that is input.
Figure 3F:
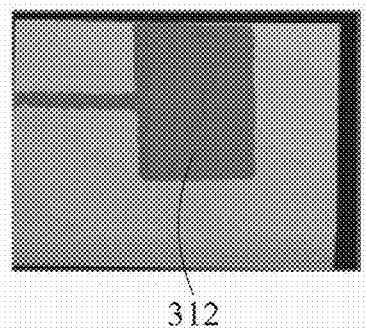
FIG. 3F illustrates an example of a depth image acquired by performing depth value compensation.
Figure 3G:
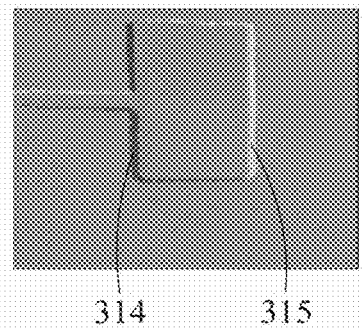
FIG. 3G illustrates an example of an occlusion image acquired by performing depth value compensation.
Figure 3H:
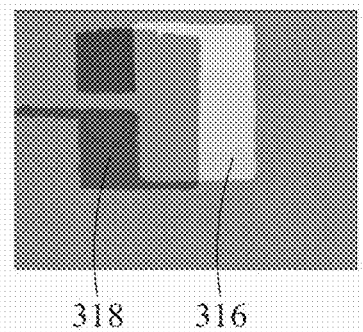
FIG. 3H illustrates an example of an occlusion accumulation image acquired by performing depth value compensation.

Hereinafter, FIGS. 3E to 3H are provided to describe noise appearing in an occlusion accumulation image acquired by performing depth value compensation. FIG. 3E illustrates an example of a color image that is input. FIG. 3F illustrates an example of a depth image acquired by performing depth value compensation. FIG. 3G illustrates an example of an occlusion image acquired by performing depth value compensation. FIG. 3H illustrates an example of an occlusion accumulation image acquired by performing depth value compensation.

FIG. 3E shows a color image that is input, where the color image includes a moving object 310 and a background 319. The moving object detecting apparatus may warp a depth image of a previous frame into coordinates of a current frame in view of a change in the pose of the camera. The moving object detecting apparatus may compensate for a depth value of an area of which the depth value in the previous frame is obtained but the depth value in the current frame is not. FIG. 3F shows a depth image acquired by performing depth value compensation, where a moving object 312 is displayed in the depth image. Compared to the depth image of FIG. 3B, an inestimable area is removed through the depth value compensation. The slanted black areas on the edges of the depth image are portions generated when the depth image is warped into the coordinates of the color image.

When the depth image of FIG. 3F is a depth image of a current frame, the occlusion image of FIG. 3G may be acquired by obtaining the depth image of FIG. 3F and a depth value difference between a depth image of a previous frame and the depth image of FIG. 3F. The moving object is moving rightward. An occlusion area 315 appears on the right side of the moving object, and a reappearance area 314 appears on the left side of the moving object.

FIG. 3H shows the occlusion accumulation image acquired by accumulating the occlusion image of FIG. 3G. The moving object detecting apparatus may acquire a clean (e.g., clear or accurate) occlusion accumulation image by accumulating compensated depth images. Compared to FIG. 3D, a clean (e.g., clear or accurate) occlusion accumulation image not including the stripe pattern 307 is acquired. A white area 316 corresponds to a depth value difference between the current frame and a frame ($k_u$ of Equation 4, for example) in which the area first appears, for an area where the moving object of the current frame is present. A dark gray area 318 corresponds to a depth value difference between the current frame and the frame ($k_u$ of Equation 4, for example) in which the area first appears, for an area where the moving object of the first frame is present. Thereafter, the moving object detecting apparatus may distinguish the moving object by truncating the occlusion accumulation image based on a predetermined criterion.

Figure 4A:
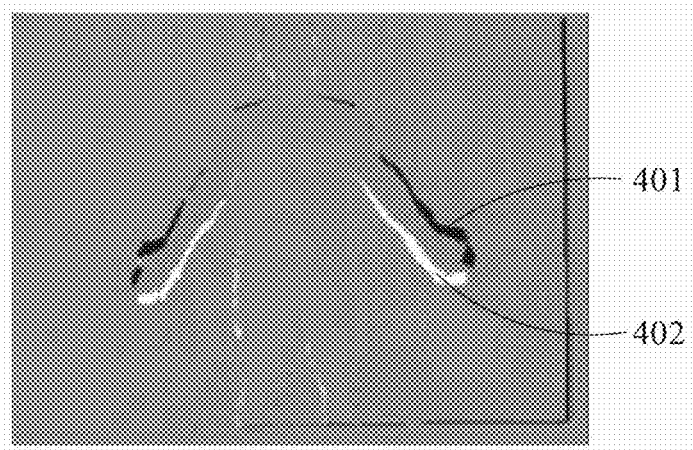
FIG. 4A illustrates an example of an occlusion image acquired by a moving object detecting apparatus.
Figure 4B:
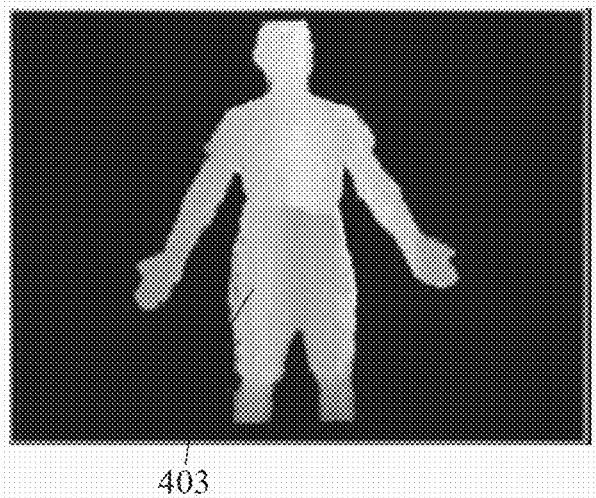
FIG. 4B illustrates an example of an occlusion accumulation image acquired by a moving object detecting apparatus.
Figure 4C:
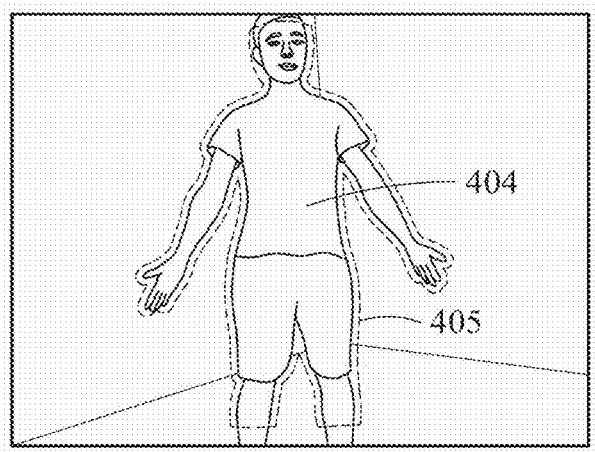
FIG. 4C illustrates an example of a masking image acquired by a moving object detecting apparatus.

FIG. 4A illustrates an example of an occlusion image acquired by a moving object detecting apparatus. FIG. 4B illustrates an example of an occlusion accumulation image acquired by the moving object detecting apparatus. FIG. 4C illustrates an example of a masking image acquired by the moving object detecting apparatus.

Referring to FIG. 4A, a moving object detecting apparatus may acquire an occlusion image by calculating a depth value difference between a depth image of a current frame and a depth image of a previous frame. In FIG. 4A, a moving object (a person, for example) has both arms down (where both arms are moving down, for example). Accordingly, occlusion areas 402 appear at the lower boundaries of the arms, and reappearance areas 401 appear at the upper boundaries of the arms.

Referring to FIG. 4B, an occlusion accumulation image acquired by accumulating the occlusion image of FIG. 4A over time is shown. In FIG. 4B, an area 403 of the moving object of the current frame is clearly displayed.

Referring to FIG. 4C, the moving object detecting apparatus may generate a masking image 405 by separating the area of the moving object and the background in the image of FIG. 4B. When the masking image 405 is mapped to a color image, the moving object 404 and the masking image 405 may be mapped with high accuracy.

Figure 5A:
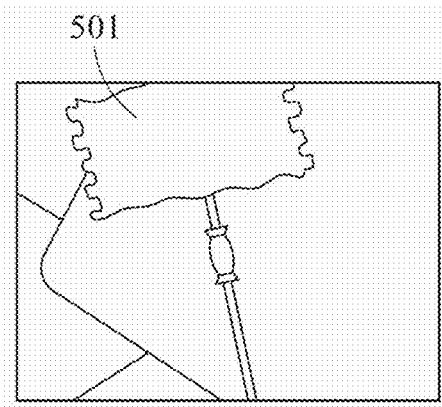
FIG. 5A illustrates an example of a color image that is input.
Figure 5B:
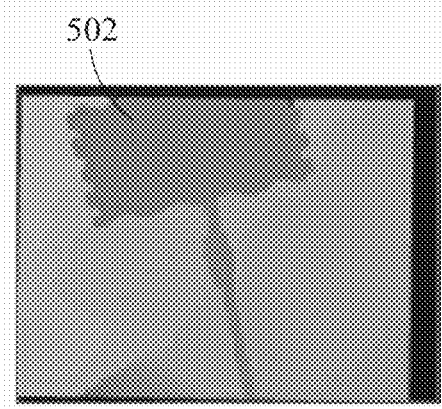
FIG. 5B illustrates an example of a depth image.
Figure 5C:
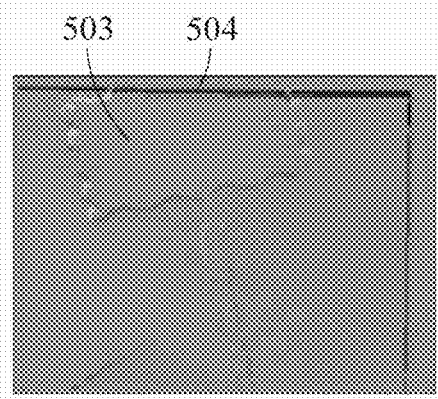
FIG. 5C illustrates an example of an occlusion image.
Figure 5D:
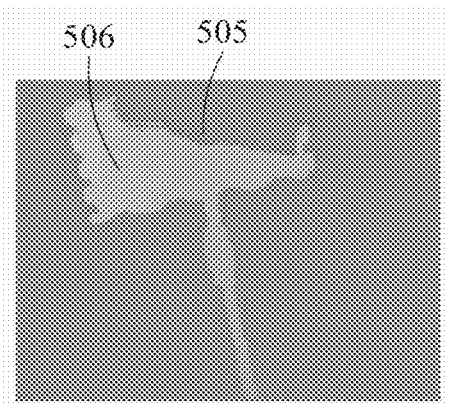
FIG. 5D illustrates an example of an occlusion accumulation image.
Figure 5E:
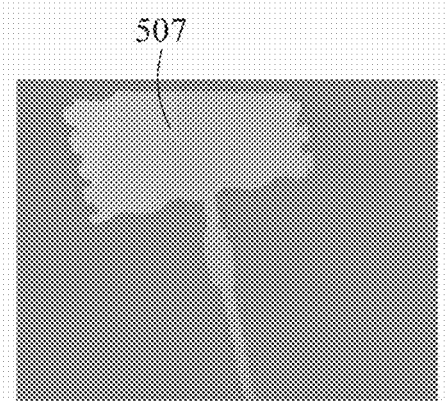
FIG. 5E illustrates an example of an occlusion accumulation image.

Hereinafter, FIGS. 5A to 5E are provided to describe an occlusion accumulation image that changes depending on whether or not a new area is estimated. FIG. 5A illustrates an example of a color image that is input. FIG. 5B illustrates an example of a depth image. FIG. 5C illustrates an example of an occlusion image. FIG. 5D illustrates an example of an occlusion accumulation image without a new area estimated. FIG. 5E illustrates an example of an occlusion accumulation image with a new area estimated.

A moving object detecting apparatus may estimate a depth difference accumulation value of a newly discovered area in an occlusion accumulation image of a current frame based on a similarity between a depth value of a depth image of the current frame and an occlusion accumulation image of a previous frame.

FIG. 5A shows a color image that is input, where a moving object 501 is moving. FIG. 5B shows a depth image, where since the moving object has a smaller depth value than the background, an area 502 of the moving object is represented in a darker gray compared to the background. The black boundaries on the edges of the screen are generated when the depth image is converted into the coordinates of the color image. FIG. 5C shows an occlusion image, where the boundary of an area 503 of the moving object is represented in white or black due to the movement of the moving object. A black boundary 504 appears due to the boundary of the camera screen.

FIG. 5D illustrates an example of an occlusion accumulation image without a new area estimated. When a moving camera discovers a new area outside the black boundary 504 of FIG. 5C, there is no depth value to compare because the previous frame does not include the new area. Thus, a new area 505 having the same depth difference accumulation value as the background appears in the occlusion accumulation image, and an area 506 displayed in the occlusion accumulation image fails to clearly represent the area of the moving object.

FIG. 5E illustrates an example of an occlusion accumulation image with a new area estimated. The moving object detecting apparatus may estimate a depth difference accumulation value of the new area based on a similarity between the depth value of the current frame and the occlusion accumulation image of the previous frame. Since this estimation process may be performed when there is a depth difference accumulation value for a nearby pixel, the moving object detecting apparatus may repeatedly perform the estimation process until all pixels for the newly discovered area are processed. Consequently, an area 507 displayed in the occlusion accumulation image clearly and accurately represents the area of the moving object.

Figure 6:
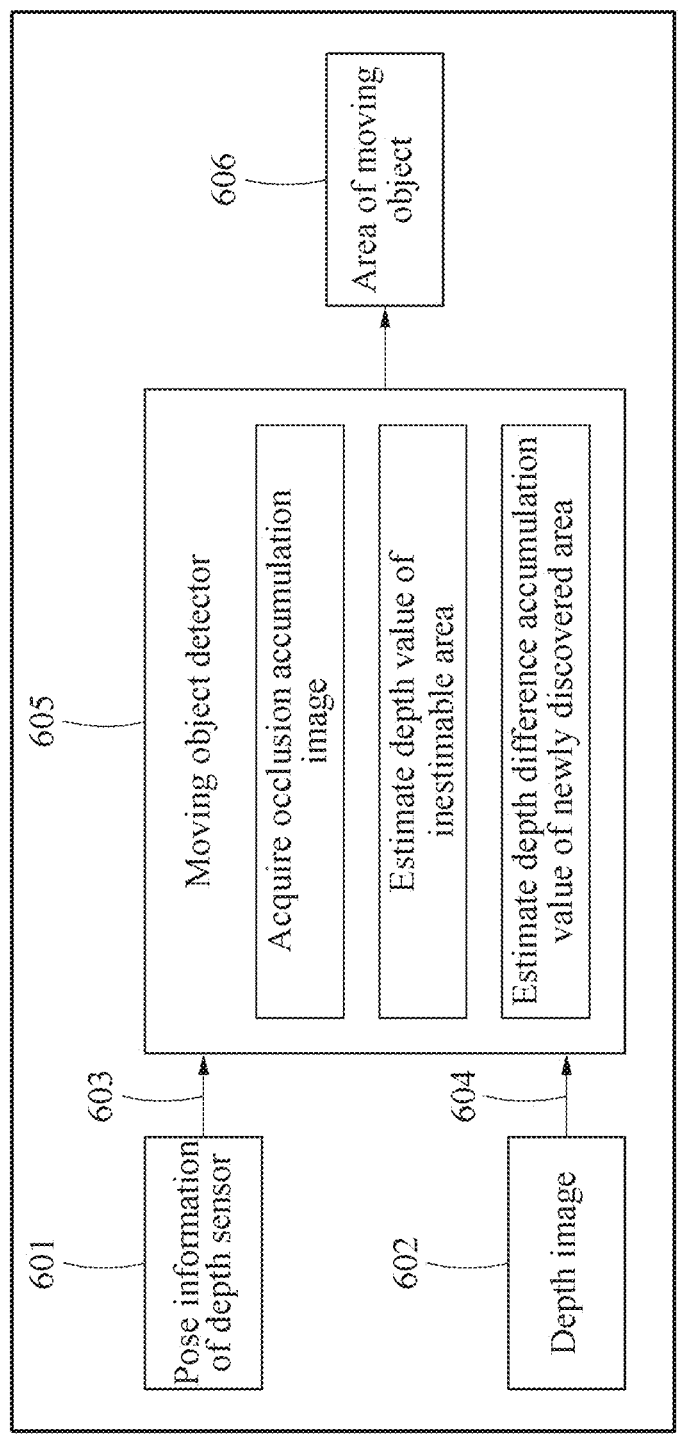
FIG. 6 illustrates an example of a framework of a moving object detecting apparatus.

FIG. 6 illustrates an example of a framework of a moving object detecting apparatus.

Referring to FIG. 6, pose information 601 of a depth sensor and a depth image 602 may be provided as inputs. In addition to the pose information 601 of the depth sensor, position information of the depth sensor may be further provided. In an example, the pose information 601 further includes the position information of the depth sensor.

In operation 603, a moving object detector 605 may receive the pose information 601 of the depth sensor. The moving object detector 605 may further receive the position information of the depth sensor. The pose information 601 and/or the position information of the depth sensor may be received from an external device or may be received from another element in the moving object detecting apparatus. In operation 604, the moving object detector 605 may receive the depth image 602.

The moving object detector 605 may estimate a depth value of an inestimable area using the pose information 601 or position information of the depth sensor. The moving object detector 605 may acquire an occlusion image from a depth value difference between a current frame and a previous frame. The moving object detector 605 may acquire an occlusion accumulation image by accumulating the occlusion image.

The moving object detector 605 may estimate a depth difference accumulation value with respect to a newly discovered area. If performed, a portion where a depth difference occurs may be recognized as the moving object. The moving object detector 605 may estimate the depth difference accumulation value of the new area based on a similarity between the depth value of the current frame and the occlusion accumulation image of the current frame. Consequently, the moving object detector 605 may acquire an area 606 of the moving object with high accuracy.

Figure 7:
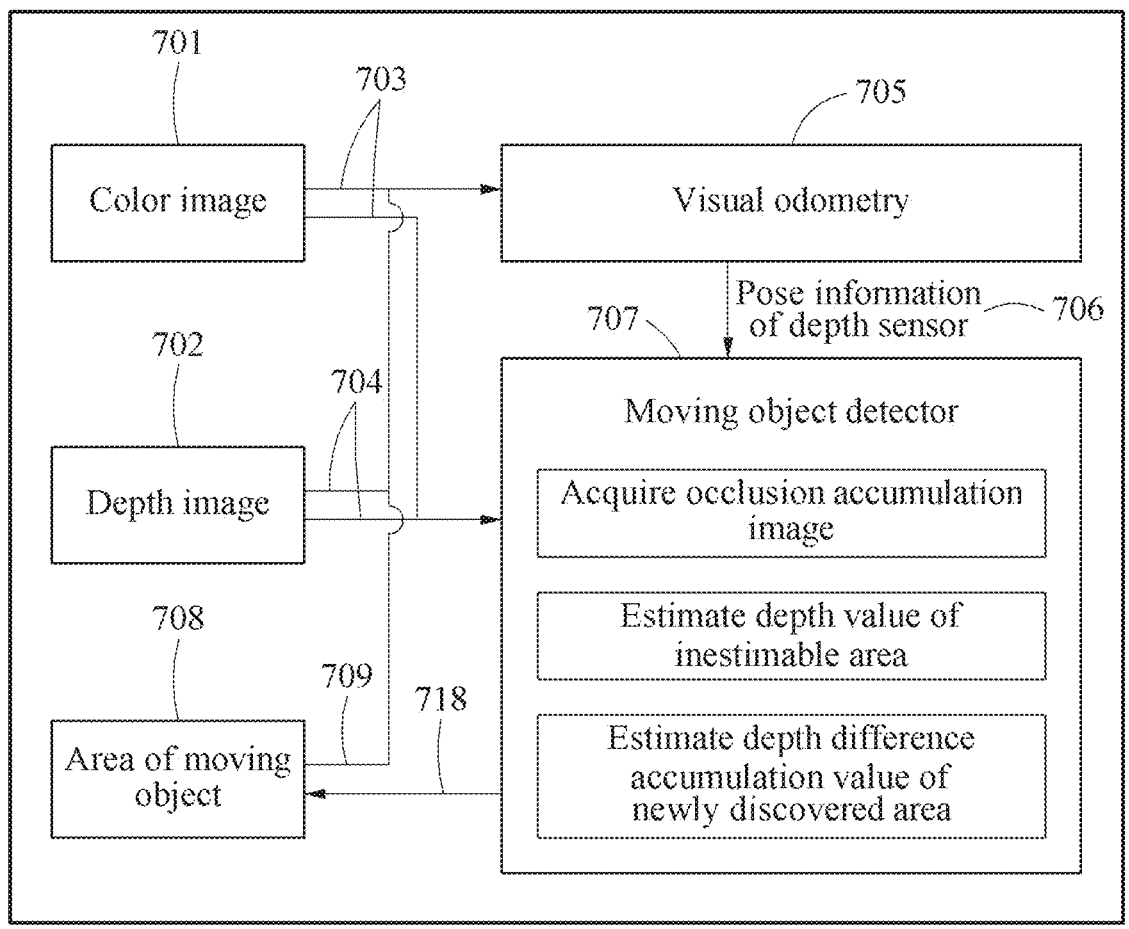
FIG. 7 illustrates an example of a framework of a moving object detecting apparatus.

FIG. 7 illustrates an example of a framework of a moving object detecting apparatus.

Referring to FIG. 7, pose information 706 of a depth sensor may be obtained by visual odometry 705. In operation 703, a color image 701 may be input into a moving object detector 707 and the visual odometry 705. In operation 704, a depth image 702 may be input into the moving object detector 707 and the visual odometry 705. In operation 709, an area 708 of the moving object of the previous frame may be input into the visual odometry 705. The visual odometry 705 may receive the color image 701, the depth image 702, and the area 708 of the moving object of the previous frame and output the pose information 706 of the depth sensor.

The moving object detector 707 may estimate a depth value of an inestimable area using the pose information 706 or position information of the depth sensor. The moving object detector 707 may acquire an occlusion image from a depth value difference between a current frame and a previous frame. The moving object detector 707 may acquire an occlusion accumulation image by accumulating the occlusion image.

The moving object detector 707 may estimate a depth difference accumulation value with respect to a newly discovered area. If performed, a portion where a depth difference occurs may be recognized as the moving object. The moving object detector 707 may estimate the depth difference accumulation value of the new area based on a similarity between the depth value of the current frame and the occlusion accumulation image of the current frame. In operation 718, the moving object detector 707 may output an area 708 of the moving object to be transferred to the visual odometry 705.

Figure 8:
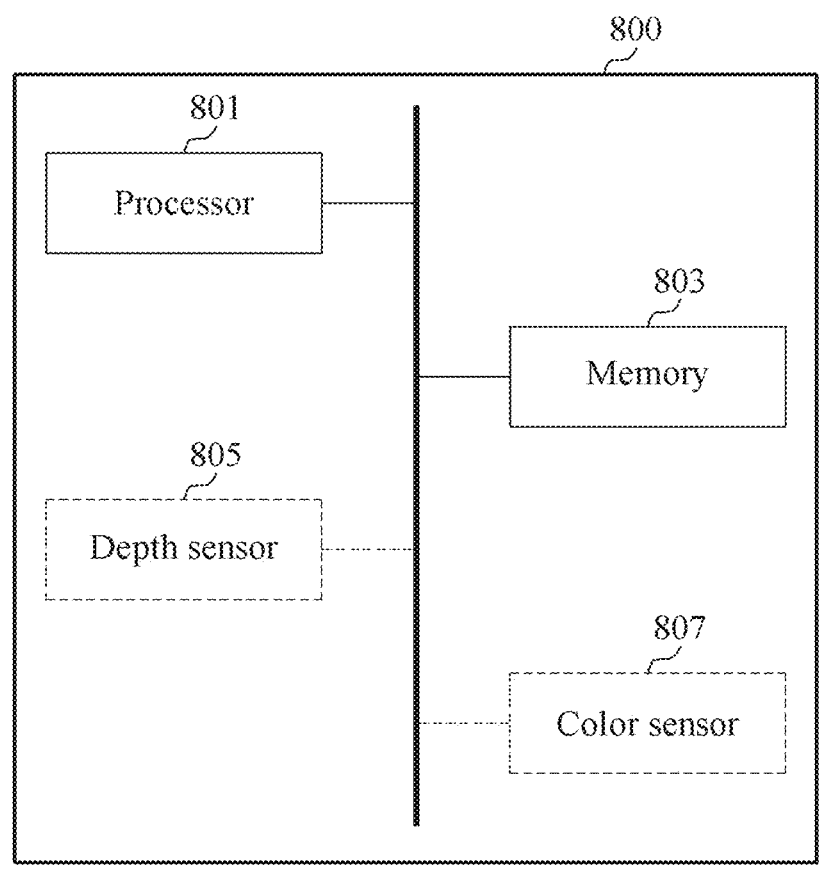
FIG. 8 illustrates an example of a configuration of a moving object detecting apparatus.

FIG. 8 illustrates an example of a configuration of a moving object detecting apparatus.

Referring to FIG. 8, a moving object detecting apparatus 800 includes at least one processor 801 (e.g., one or more processors) and a memory 803. The moving object detecting apparatus 800 may further include a depth sensor 805 and/or a color sensor 807.

The processor 801 may estimate a depth image of a current frame. The processor 801 may acquire an occlusion image of the current frame by calculating a depth difference value between the estimated depth image of the current frame and an estimated depth image of a previous frame. The processor 801 may acquire an occlusion accumulation image of the current frame by adding a depth difference value of the occlusion image of the current frame to a depth difference accumulation value of an occlusion accumulation image of the previous frame. The processor 801 may output an area of the moving object based on the occlusion accumulation image.

The processor 801 may warp coordinates of a depth image of a previous frame into coordinates of the depth image of the current frame based on position information or pose information of a camera. The processor 801 may estimate an area having an inestimable depth value in the depth image of the current frame using the warped depth image of the previous frame.

The processor 801 may estimate a depth difference accumulation value of a newly discovered area in an occlusion accumulation image of a current frame based on a similarity between a depth value of a depth image of the current frame and an occlusion accumulation image of a previous frame.

The processor 801 may initialize a pixel with a depth difference accumulation value being less than or equal to a first threshold value in the occlusion accumulation image. The processor 801 may initialize a pixel with a depth difference value being less than or equal to a second threshold value in the occlusion accumulation image.

The processor 801 may obtain an area including one or more pixels having a depth difference accumulation value being greater than a first threshold value in the occlusion accumulation image. The processor 801 may output a masking image representing the area of the moving object based on the obtained area.

The moving object detectors, moving object detectors, moving object detecting apparatuses, processors, memories, depth sensors, color sensors, moving object detector 605, moving object detector 707, moving object detecting apparatus 800, processor 801, memory 803, depth sensor 805, color sensor 807, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method of detecting a moving object, the method comprising:
   estimating a depth image of a current frame;
   determining an occlusion image of the current frame by calculating a depth difference value between the estimated depth image of the current frame and an estimated depth image of a previous frame;
   determining an occlusion accumulation image of the current frame by adding a depth difference value of the occlusion image of the current frame to a depth difference accumulation value of an occlusion accumulation image of the previous frame; and
   outputting an area of a moving object based on the occlusion accumulation image,
   wherein the determining of the occlusion accumulation image of the current frame comprises estimating a depth difference accumulation value of a newly discovered area in the occlusion accumulation image of the current frame based on a similarity between a depth value of the depth image of the current frame and the occlusion accumulation image of the previous frame.

2. The method of claim 1, wherein the estimating comprises:
   warping coordinates of the depth image of the previous frame into coordinates of the depth image of the current frame based on position information or pose information of a camera; and
   estimating an area having an inestimable depth value in the depth image of the current frame using the warped depth image of the previous frame.

3. The method of claim 2, wherein
   the outputting of the area comprises outputting the area of the moving object in a color image, and
   the area having the inestimable depth value is an area having a depth value that is not estimated by a depth sensor used to generate the depth images due to a position or angle difference between the depth sensor and another sensor used to estimate the color image.

4. The method of claim 1, wherein the newly discovered area corresponds to an area outside of a boundary of the depth image of the current frame.

5. The method of claim 1, wherein the determining of the occlusion accumulation image of the current frame comprises initializing a pixel with a depth difference accumulation value being less than or equal to a first threshold value in the occlusion accumulation image.

6. The method of claim 5, wherein the initializing of the pixel comprises initializing the depth difference accumulation value of the pixel to a value of "0".

7. The method of claim 1, wherein the determining of the occlusion accumulation image of the current frame comprises initializing a pixel with a depth difference value being less than or equal to a second threshold value in the occlusion accumulation image.

8. The method of claim 1, wherein the outputting comprises:
   determining an area including one or more pixels having a depth difference accumulation value being greater than a first threshold value in the occlusion accumulation image; and
   outputting a masking image representing an area of the moving object based on the determined area.

9. A non-transitory computer-readable storage medium storing instructions that, when executed by one or more processors, configure the one or more processors to perform the method of claim 1.

10. An apparatus for detecting a moving object, the apparatus comprising:
    one or more processors configured to:
    estimate a depth image of a current frame,
    determine an occlusion image of the current frame by calculating a depth difference value between the estimated depth image of the current frame and an estimated depth image of a previous frame,
    determine an occlusion accumulation image of the current frame by adding a depth difference value of the occlusion image of the current frame to a depth difference accumulation value of an occlusion accumulation image of the previous frame, and
    output an area of a moving object based on the occlusion accumulation image, wherein, for the determining of the occlusion accumulation image of the current frame, the one or more processors are configured to estimate a depth difference accumulation value of a newly discovered area in the occlusion accumulation image of the current frame based on a similarity between a depth value of the depth image of the current frame and the occlusion accumulation image of the previous frame.

11. The apparatus of claim 10, wherein, for the estimating, the one or more processors are configured to:
    warp coordinates of the depth image of the previous frame into coordinates of the depth image of the current frame based on position information or pose information of a camera, and
    estimate an area having an inestimable depth value in the depth image of the current frame using the warped depth image of the previous frame.

12. The apparatus of claim 10, wherein, for the determining of the occlusion accumulation image of the current frame, the one or more processors are configured to:
    initialize a pixel with a depth difference accumulation value being less than or equal to a first threshold value in the occlusion accumulation image.

13. The apparatus of claim 10, wherein, for the determining of the occlusion accumulation image of the current frame, the one or more processors are configured to:
    initialize a pixel with a depth difference value being less than or equal to a second threshold value in the occlusion accumulation image.

14. The apparatus of claim 10, wherein, for the outputting, the one or more processors are configured to:
    obtain an area including one or more pixels having a depth difference accumulation value being greater than a first threshold value in the occlusion accumulation image, and
    output a masking image representing an area of the moving object based on the obtained area.

15. The apparatus of claim 10, further comprising a memory storing instructions that, when executed by the one or more processors, configure the one or more processors to perform the estimating of the depth image of the current frame, the determining of the occlusion image of the current frame, the determining of the occlusion accumulation image of the current frame, and the outputting of the area of the moving object.

16. A processor-implemented method of detecting a moving object, the method comprising:
    acquiring a current depth image including an area in which a depth value is not obtained by a depth sensor;
    estimating the current depth image, including the area not obtained by the depth sensor, by warping a previous depth image into coordinates of the current depth image; and
    determining a current occlusion image by calculating a difference between the estimated depth image and the previous depth image;
    determining a current occlusion accumulation image by adding the current occlusion image to a previous occlusion accumulation image; and
    outputting an area of a moving object based on the current occlusion accumulation image,
    wherein the determining of the occlusion accumulation image of the current frame comprises estimating a depth difference accumulation value of a newly discovered area in the occlusion accumulation image of the current frame based on a similarity between a depth value of the depth image of the current frame and the occlusion accumulation image of the previous frame.

* * * * *